United States Patent [19]

Clark

[11] 4,125,938

[45] Nov. 21, 1978

[54] SPARK PLUG COVER REMOVER

[75] Inventor: Robert E. Clark, Minneapolis, Minn.

[73] Assignee: Thexton Manufacturing Company, Minneapolis, Minn.

[21] Appl. No.: 789,508

[22] Filed: Apr. 21, 1977

[51] Int. Cl.[2] ........................ B23P 19/04; B25B 27/02

[52] U.S. Cl. ........................................ 29/764; 29/268; 29/280; 81/425 A

[58] Field of Search ................. 29/764, 283, 268, 278, 29/280; 81/425 A, 425 R, 426, 418

[56] References Cited

U.S. PATENT DOCUMENTS

| | | | |
|---|---|---|---|
| 486,486 | 11/1892 | Lewis | 81/425 R |
| 1,338,540 | 4/1920 | Wake | 81/425 R |
| 1,617,703 | 2/1927 | Christianson | 81/426 |
| 2,851,769 | 9/1958 | Johnson | 29/280 |
| 3,049,798 | 8/1962 | Denis | 29/268 |
| 3,599,309 | 8/1971 | Mulligan | 29/764 |
| 3,727,286 | 4/1973 | Kimmett | 29/764 |
| 3,768,138 | 10/1973 | Trapp | 81/425 R |

FOREIGN PATENT DOCUMENTS

| | | | |
|---|---|---|---|
| 387,740 | 7/1908 | France | 81/425 |

*Primary Examiner*—Lowell A. Larson
*Assistant Examiner*—Daniel C. Crane
*Attorney, Agent, or Firm*—H. Dale Palmatier

[57] ABSTRACT

A spark plug cover removing tool having a pair of lever arms which are very short and have hook-shaped gripping portions and jaws which are circular to embrace and grip the boot covering a spark plug, the jaws extending substantially less than semicircularly to define longitudinal edges to bite into the resilient spark plug boot and end lips or flanges extending transversely of the end of the jaws to bear against the end of the boot.

2 Claims, 6 Drawing Figures

FIG. 1
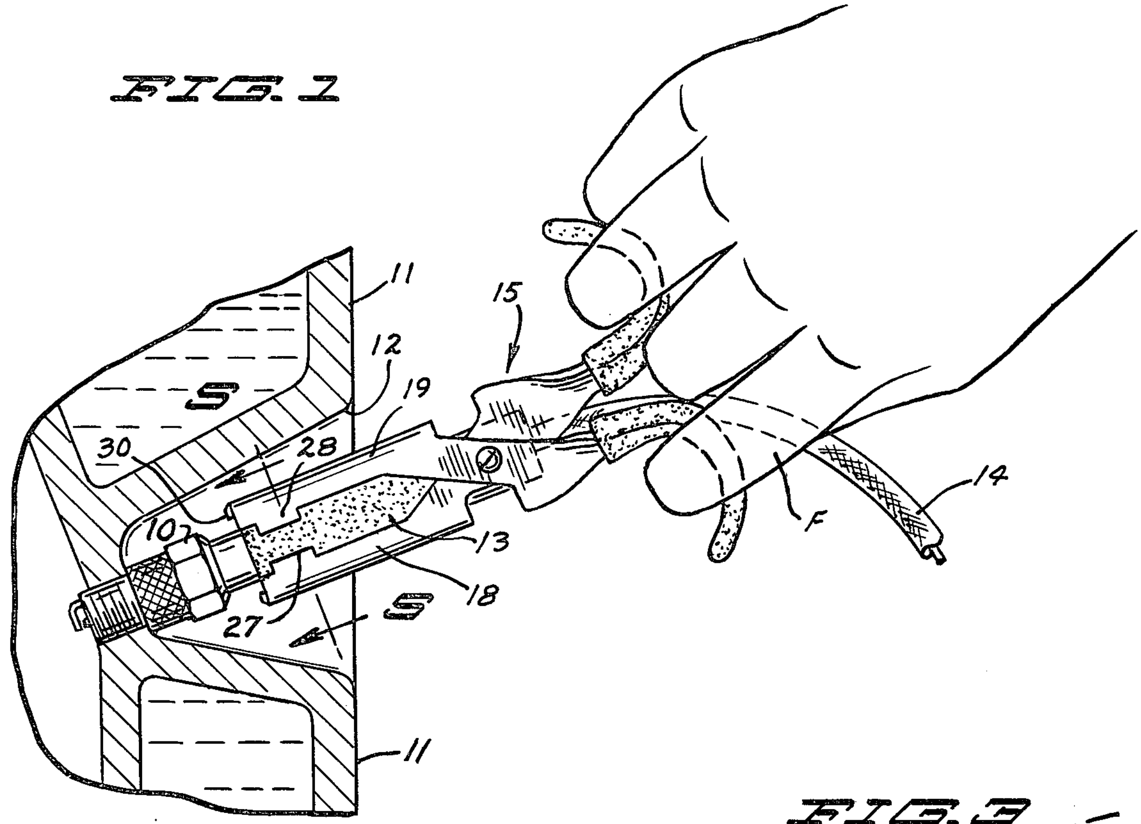
FIG. 3
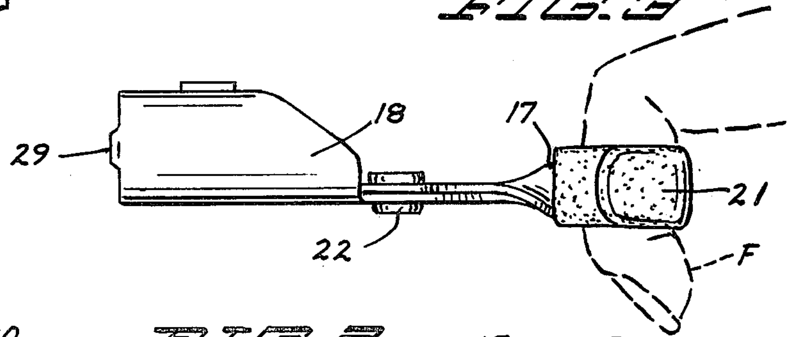
FIG. 4
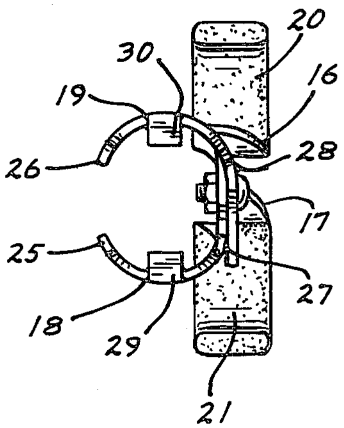
FIG. 2
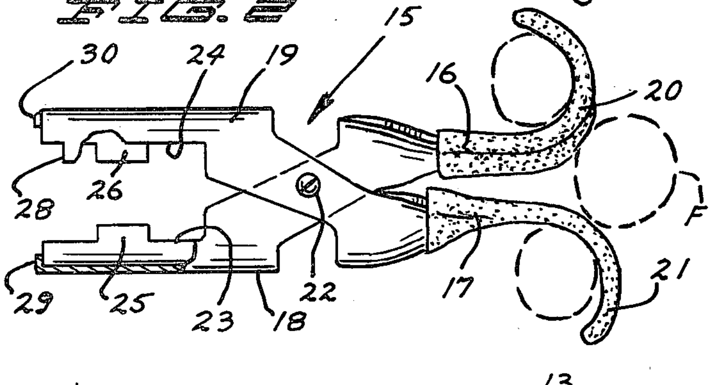
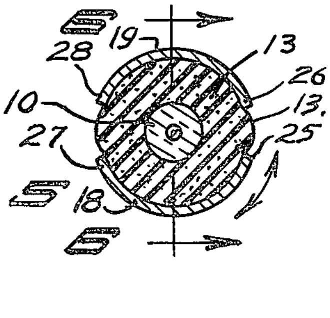
FIG. 5
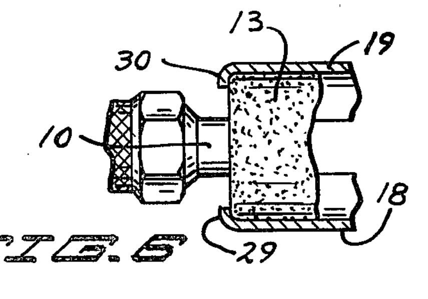
FIG. 6

SPARK PLUG COVER REMOVER

This invention relates to a tool for removing the rubber cover or boot and wire from a spark plug of an automotive type engine.

BACKGROUND OF THE INVENTION

The spaces immediately adjacent the engine in a modern automobile have become quite congested with auxiliary equipment and necessary accessories to the engine. Access to the spark plugs in many engines has become very difficult. Oftentimes the mechanic can hardly see the location of the spark plug, and in many instances, it is almost impossible for the mechanic to reach his hand into the vicinity of the cover or boot for the spark plug for the purpose of removing the boot when the spark plug is to be changed.

Modern engines are constructed so that the engine block has a well or deep recess for each of the spark plugs, and the threads into which the spark plug is turned are disposed at the bottom of the well so that the spark plug is nearly concealed in the well and access to the spark plug is extremely difficult.

Each spark plug is enclosed by a rubber or soft plastic cover or boot for the purpose of protecting the spark plug against physical damage and against being wetted due to splashing water and similar contaminants.

Of course, the spark plug wire and boot are subject to considerable amount of damage if the mechanic merely grips the wire and pulls the boot from the plug; and when this is done, the wire will oftentimes separate from the boot, necessitating the purchase and installation of a replacement wire and boot assembly.

Although it is highly desirable that the boot itself be gripped, oftentimes the boot is located in the well for the spark plug so that access to the boot becomes extremely difficult. Even if the mechanic can manually grip the outer end of the boot where it emerges from the spark plug well, removal of the boot without damaging it cannot be accomplished with certainty. Oftentimes the boot has been in place on the spark plug for a considerable number of months or a couple of years, and, in order to loosen the boot from the spark plug, it is necessary to grasp and rotate the boot prior to exerting an endwise pull.

None of the tools in the prior art have been suitable for properly handling a spark plug cover or boot during the removal of the boot from the spark plug.

SUMMARY OF THE INVENTION

This invention provides a spark plug cover removing tool which is well adapted for reaching into confined spaces and gripping the cover or boot of a spark plug by gripping the boot and initially rotating the boot on the spark plug prior to exerting an endwise thrust on the boot for pulling it off the spark plug. The tool has a pair of handles for manual gripping, and which are connected to swingable jaws for clamping onto the spark plug boot. The jaws are disposed off to one side of the handles so that the handles may be laid alongside the boot while the jaws embrace and substantially encompass the boot.

The jaws of the tool are smoothly rounded and substantially circular to follow the contour of the spark plug boot; however, it is found advantageous that the jaws extend only partly around the boot so that longitudinally extending edges of the jaws pinch into the periphery of the spark plug boot for gripping it and making possible rotating of the boot before pulling it off the plug.

The jaws of the tool also have transversely projecting lips or flanges at the inner end of the jaws and immediately adjacent the longitudinal gripping edges so as to bear endwise against the end face of the boot for extracting the boot after the boot has been loosened from the spark plug body.

BRIEF DESCRIPTION OF THE DRAWINGS

FIG. 1 is an elevation view of the tool being manipulated by a person in removing a spark plug cover from a spark plug in an automotive type engine.

FIG. 2 is an elevation view of the tool partly broken away and partly shown in section for clarity of detail.

FIG. 3 is a top plan view of the invention.

FIG. 4 is an end elevation view thereof.

FIG. 5 is an enlarged detail section view taken approximately at 5—5 of FIG. 1.

FIG. 6 is a detail section view taken approximately at 6—6 in FIG. 5.

DETAILED SPECIFICATION

One form of the invention is shown in the drawings and is described herein.

A spark plug indicated by numeral 10 is shown to be mounted in the sidewall of an automotive type engine 11 which typically has a well 12, at the bottom of which the spark plug is threadably mounted. The spark plug is embraced by and enclosed within a soft and resilient cover or boot 13 which in most cases is made of soft rubber or resilient plastic, and the boot 13 will extend sufficiently far down over the porcelain body of the spark plug as to completely cover the electrical terminal on the tip end of the plug for the purpose of electrically connecting the terminal end of the spark plug to the spark plug wire 14 which emerges from the cover 13 and is oftentimes formed in one piece therewith.

The spark plug cover removing tool is indicated in general by numeral 15 and comprises a pair of lever arms 16 and 17 which are preferably constructed of hot rolled steel which is pickled and oiled and may be approximately one-sixteenth of an inch in thickness. The handles 16 and 17 are formed in one piece with the respective jaws 18 and 19, and each of these parts is formed by blanking it out of a large piece of stock on a punch press machine. The two lever arms 16 and 17, together with their respective jaws, are actually formed of identical stamped out parts, and then are bent oppositely to form lefthand and righthand parts in this tool. The lever arms 16 and 17 are substantially bar-shaped and are curved into hook-shaped grips 20 and 21 which are preferably rubber coated, as illustrated. The grips 20 and 21 have broad and smoothly curved inner and outer surfaces of considerable width so that they may be engaged and manipulated by the sides of the person's fingers F as illustrated in full lines in FIG. 1 and in dotted lines in FIG. 3.

The lever arms 16 and 17 are interconnected by a pivot 22 which may be in the form of a rivet or a bolt.

As clearly seen in FIG. 4, the handles or lever arms 16 and 17 are located off to one side of the jaws 18 and 19 so that the handles or lever arms may easily lie alongside the spark plug wire cover 13 and the wire 14 without causing any unnecessary flexing of the cover 13 as it is being removed.

Each of the jaws 19 is formed integrally of and in one piece with its respective handle and is smoothly curved in a circular shape so that, at least in one position of the jaws, the curvatures of the two jaws have a common axis extending longitudinally between and along the two jaws. It will therefore be recognized that each of the jaws 18 and 19 is substantially cylindrical in shape, or partially cylindrical, throughout a substantial portion of its length. Each of the jaws extends peripherally through an arc which is substantially less than a semicircle, and each of the jaws has opposite side edges 23 and 24 which normally confront each other, but are in widely spaced relation with each other. The jaws have peripherally projecting rigid tabs 25 and 26 confronting each other at one side of the jaws, and have additional rigid tabs 27 and 28 also confronting each other at the other side of the jaw. The tabs 27 and 28 are located closely adjacent the terminal ends of the jaws, and the tabs 25 and 26 are located somewhat remote from the terminal ends and are closer to the pivot 22 than are the rigid gripping tabs 27 and 28.

At the terminal ends of the jaws, a pair of inwardly turned lips 29 and 30 project a short distance inwardly, in a direction transversely of the elongate jaw. It should be recognized that the inwardly turned lips 29 and 30 extend inwardly from the outer walls of the jaws a distance approximating only about twice the thickness of the jaw material so that when the tool is being applied to a spark plug confined in the well 12 of an engine, the lips 29 and 30 may pass downwardly along the cover 13 while the jaws 18 and 19 are open and sliding inwardly on the engine wall which defines the well 12. It will be recognized that the tool can be readily manipulated by the person's fingers so that the grips can be swung with respect to each other for opening and closing the jaws slightly to the extent necessary as to induce the jaws to pass by the cover or boot 13 on the plug.

When the lips 29 and 30 have passed by the end face of the boot 13, the jaws 18 and 19 are urged inwardly to bear against and squeeze the boot or cover 13. When this squeezing occurs, a peripheral portion of the cover 13 is indicated at 13.1 in FIG. 6. This small bulge 13.1 indicates that the longitudinal edges of the jaws are biting into the cover or boot, and accordingly, the tool 15 may be rotated on an axis longitudinally through the spark plug so as to turn the cover or boot 13 and free it from the surface of the plug. While the cover 13 is being rotated on the plug, the initial movement is only rotational, and when the mechanic feels in his hand that the cover has freed itself from the plug, the tool 15 will be drawn away from the spark plug 10 so as to pull the cover 13 off the body of the plug.

During the process of drawing the cover 13 off the plug, the lips 29 and 30 bear against the end face of the cover 13 and urge the cover off the plug without interfering to any extent with the relationship between the cover 13 and the wire 14 and the junction between the cover and wire. In other words, because the lips 29 and 30 lift the cover 13 off the spark plug, there will be no damage whatever to the cover or to the wire.

When the cover 13 has been removed from the plug, the mechanic can, by simply manipulating his fingers, spread the lever arms 16 and 17 apart so that the jaws 18 and 19 release the cover.

It will be seen that I have provided a new and improved spark plug cover removing tool which may be manipulated by the tip ends of a person's fingers in remote locations so that the gripping jaws can be inserted into the well of the automotive engine to embrace and encompass the cover of the spark plug. The jaws have longitudinal gripping edges which squeeze the cover and facilitate applying a rotary motion to the cover for the purpose of loosening the cover from the body of the spark plug. The inwardly turned lips at the ends of the jaws will thereafter simply lift the cover off the spark plug, and the cover may be readily released by simple manipulation of the mechanic's fingers.

I claim:

1. A spark plug cover removing tool, comprising a pair of elongate lever arms of flat rolled steel and lying along each other and having hook shaped handle means turned outwardly away from each other at corresponding ends of the arms to be manually gripped, the lever arms having flat intermediate portions lying against each other adjacent the handle means and crossed in relation to each other, pivot means swingably connecting the flat intermediate portions of said lever arms together, and a pair of elongate gripping jaws lying along each other, each formed integrally of a respective lever arm and confronting each other to be swung about said pivot means and moved toward and away from each other to embrace and release such spark plug cover, the jaws having a length from the pivot means substantially the same as the length of such a spark plug cover and substantially the same as the handle means from the pivot means, the jaws in one position being of circular shape about a single axis and each of the jaws extending peripherally through an arc which is substantially less than semicircular, the jaws having inner ends adjacent the pivot means to which said intermediate portions of the arms are connected such that said flat intermediate portions lie substantially tangentially of the arcuately curved jaws whereby the jaws are entirely at one side of the lever arms and whereby a spark plug cover and cable therefrom may extend through the jaws and along the intermediate portions and handle means of the lever arms without obstruction, and each of the jaws having a terminal end and an inwardly turned lip to engage and bear endwise against the end of the plug cover, each of the elongate jaws having a pair of longitudinally extending side edges confronting the side edges of the other jaw, and each of the jaws having peripherally extending rigid gripping tabs projecting from the side edges of the jaw and extending toward each other and biting into the resilient plug cover to facilitate turning the cover against resistance.

2. The spark plug cover removing tool according to claim 1 and the tabs on one side of the jaws being located closer to the terminal end of the jaws than are the other tabs, each pair of tabs having side edges directly confronting each other.

* * * * *